United States Patent Office 3,562,348
Patented Feb. 9, 1971

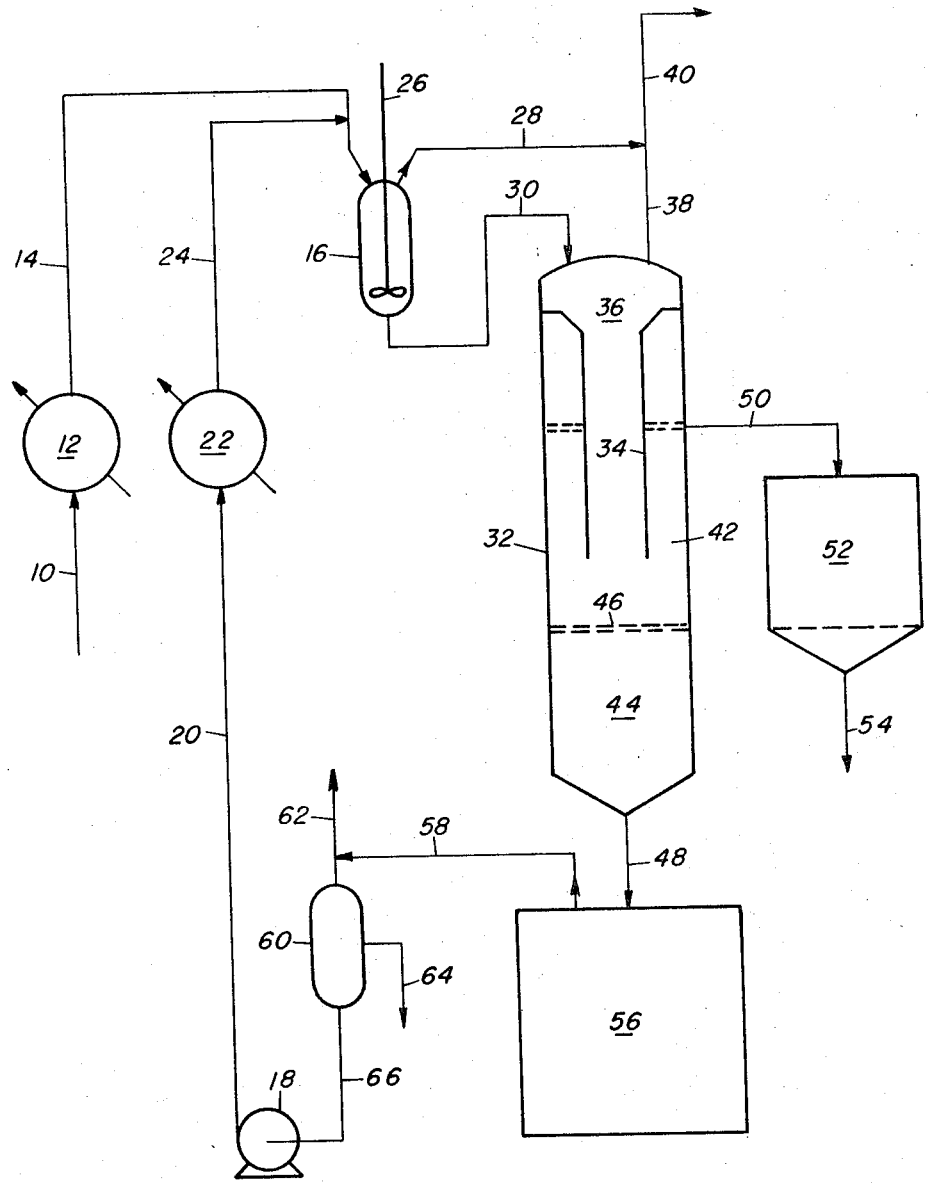

3,562,348
PRODUCTION OF ALUMINUM-FREE HYDROCARBON
David M. Jenkins, Penn Hills Township, Allegheny County, Pa., assignor to Gulf Research & Development Company, Pittsburgh, Pa., a corporation of Delaware
Filed Sept. 11, 1968, Ser. No. 759,037
Int. Cl. C07c *11/02*
U.S. Cl. 260—677                                               8 Claims

ABSTRACT OF THE DISCLOSURE

Organo-aluminum compounds are removed from a hydrocarbon stream by hydrolysis with water, alone, by forming a hydrocarbon-water admixture, separating gases from the admixture in an upper zone and flowing the hydrocarbon-water admixture to intermediate and lower zones for separation of the hydrocarbon from an aqueous aluminum slurry. The process is conducted at elevated temperatures below the boiling point of water.

---

This invention relates to the separation of aluminum from olefinic hydrocarbons. More particularly, this invention relates to the separation of aluminum from the product stream of an alpha olefin process wherein ethylene is polymerized to form alpha olefins in the presence of an organo-aluminum catalyst.

Ethylene may be polymerized to normal alpha olefins having between about 4 and 40 carbon atoms in the presence of an organo-aluminum catalyst, such as triethyl aluminum, which is charged to the process in a catalyst solvent. The reaction temperature can be between about 180° and 240° C., while employing a reaction pressure of at least about 1,000 pounds per square inch. The catalyst is utilized in amounts of between about $1 \times 10^{-4}$ and $1 \times 10^{-2}$ mols of catalyst per mol of ethylene. The polymerization is usually conducted until there is a conversion of about 30 to 60 percent of the ethylene feedstock to polymer product. Such process conditions are merely illustrative and, for example, the details of a suitable process for producing alpha olefins can be found in Ser. No. 608,127, filed Jan. 9, 1967.

In general, the product from the alpha olefin process, disregarding catalyst solvent, comprises between about 10 and 75 weight percent unreacted ethylene. The remainder is an alpha olefin product and between about 0.2 to about 4 weight percent of the organo-aluminum catalyst having three alkyl groups with each group having an average of about 8 carbon atoms. For example, the product from the alpha olefin process commonly comprises about 49 or 50 weight percent unreacted ethylene, about 49 or 50 weight percent alpha olefin product and about 2 weight percent of the organo-aluminum catalyst.

It is important to substantially completely remove all of the aluminum prior to further treatment of the olefinic hydrocarbon product. For example, the presence of aluminum in the alpha olefin product to a distillation column under distillation conditions will seriously degrade the alpha olefin product and will be generally deleterious to the distillation operation.

It has been proposed to remove the aluminum from the product stream of the alpha olefin process by contacting a dilute solution of aluminum alkyls dissolved in olefins with an aqueous caustic solution so as to hydrolyze the aluminum alkyl catalyst. Aqueous caustic is employed so that sodium aluminate, which is soluble in the resulting aqueous phase, is formed. The olefins are separated from the caustic in a large settling tower, which serves both as a flash chamber to remove ethylene and other light olefins, and as a settler. The liquid olefin stream which contains dissolved ethylene and possibly some caustic is mixed with water and is recovered in a second settling tower. The water-olefin feed to this second settling tower forms stable emulsions, and an electrolyte, such as a salt, must be added to break these emulsions.

In order to avoid the added expense of the caustic and the salt, it has been suggested to employ water, alone, for the hydrolysis of the aluminum alkyl. However, the employment of only water in the hydrolysis process causes the immediate formation of an aluminum hydroxide precipitate, which is insoluble in both the organic and the aqueous phases, thereby resulting in a plugging of the equipment process lines with the aluminum hydroxide.

It has now been found that the employment of costly caustic soda and salt in the hydrolysis of aluminum alkyl present in an olefinic hydrocarbon stream can be obviated and the plugging of the process lines with aluminum hydroxide can be avoided while employing water in the absence of caustic soda in the hydrolysis operation.

In accordance with the present invention, a process for the separation of aluminum from an olefinic hydrocarbon stream containing an organo-aluminum compound is provided, which process comprises forming an admixture of the hydrocarbon stream and water, introducing the admixture into an upper zone, separating a gaseous fraction from the admixture in the upper zone, passing the liquid fraction of the admixture to an intermediate zone, passing an aluminum-rich aqueous portion of the admixture to a lower zone, and withdrawing a substantially aluminum-free olefin stream from the intermediate zone. The process of the present invention is conducted at an elevated temperature below about the boiling point of water, i.e. less than about 100° C. at a pressure of one atmosphere. Obviously higher temperatures can be used at elevated pressures. For example, temperatures up to about 130° C. may be employed at pressures above one atmosphere, so long as the boiling point is not exceeded at the pressure utilized.

Surprisingly, the process of the present invention permits the employment of water, alone, in the hydrolysis of the aluminum alkyl that may be present in the olefinic hydrocarbon stream resulting, for example, when ethylene is reacted with an aluminum alkyl catalyst, such as triethyl aluminum, to produce alpha olefins.

More specifically, the present process comprises, initially, the reaction of the aluminum alkyl present in the olefinic hydrocarbon stream with water under conditions of intimate contact between the water and olefin phases. Next, the hydrolyzed olefinic effluent stream is passed to a column or stratification chamber which is provided with an inlet line in the upper region thereof wherein a gas separation zone is provided.

The hydrolyzed effluent stream is preferably directed along a solid, vertical surface and the gases in the inlet stream are caused to separate from the liquid in the stream, for example by flashing, which causes frothing and foaming in the column. When the olefinic hydrocarbon stream is that resulting from the polymerization of ethylene with an aluminum alkyl catalyst, the separated gases will comprise ethylene, ethane, butenes and butanes.

The liquid alpha olefin product and the aqueous aluminum hydroxide, that results upon hydrolysis of the aluminum alkyl, descend through the gas separation zone to an intermediate liquid alpha olefin settling zone. The aqueous aluminum hydroxide continues to descend through the liquid alpha olefin zone to a lower zone in which the aqueous aluminum hydroxide settles. The light olefinic gases are withdrawn from the upper gas separation zone and an aluminum-depleted liquid alpha olefin product is withdrawn from the intermediate zone. An aqueous aluminum hydroxide slurry is discharged from the lower aqueous aluminum hydroxide zone and may be passed to an aluminum hydroxide settling tank, filter, centrifuge, or the like, for separation of aluminum hydroxide from the slurry. After separation of the aluminum hydroxide from the water is conducted in the settling zone, etc., the water containing suspended aluminum hydroxide may be recycled to the hydrolysis system. Surprisingly, the aluminum hydroxide resulting in the present process does not plug the process lines and may be easily transported as desired.

The temperatures employed in the present process are vital to the success of the invention. The process of the present invention, including the hydrolysis step and the subsequent component separation steps, is conducted at elevated temperatures below about the boiling point of water. Thus, suitable temperatures include, for example, between about 85° and about 130° C., preferably between about 90° and about 100° C. or the boiling point of water depending upon the pressure on the system. Temperatures as low as 75° and 80° C. give inferior results. At the elevated temperatures of the present process, the aluminum hydroxide floc that results upon hydrolysis is more readily wetted by water in the system than by the olefin. This permits the olefin product to be recovered in a state that is relatively free of floc. The term "elevated temperatures" as employed herein include those temperatures which will permit the recovery of an olefinic hydrocarbon substantially free of aluminum hydroxide.

The process of the present invention produces an aluminum hydroxide precipitate that is very fine and which settles more rapidly than the time normally required, thus resulting in a high purity olefin. Additionally, the present process has the advantages of: eliminating the expense of caustic and salt; a reduced waste disposal expense, since the sodium aluminate by-product of a caustic process is not of salable quality; a lower olefin loss in the aqueous phase; and no plugging of process lines with aluminum hydroxide.

The operation of the process of this invention will be more completely understood by the following example set forth with reference to the accompanying drawing.

Referring to the drawing, a mixture of alpha olefins prepared by the reaction of ethylene and triethyl aluminum, which is depleted in unreacted ethylene and most of the butene, and containing 0.11 percent aluminum in the form of aluminum trialkyl is introduced by means of the line 10 into the heat exchanger 12. The temperature of the olefin stream is raised therein to between about 86° and about 92° C. The heated olefin stream is conducted by means of the line 14 to a mixing chamber 16 at the rate of about 140 pounds per hour.

Meanwhile, water is pumped at the rate of 78 to 82 pounds per hour by means of pump 18 through line 20 into a heat exchanger 22 wherein the temperature of the water is raised to between about 95° and about 98° C. Next, the heated water stream is introduced by means of the line 24 into the mixing chamber 16 for admixture with the heated olefin stream. The temperature in the mixing chamber is between about 86° and about 94° C. Although mixing chamber 16 is illustrated in the drawing as a stirred vessel employing an agitator 26, any suitable means of intimately contacting the water and olefin phases may be employed. Thus, for example, adequate mixing can be induced by means of an orifice, a mixing valve, a mixing T and the like. The following reaction takes place between the water and the aluminum alkyl:

$$AlR_3 + 3H_2O \rightarrow Al(OH)_3 + 3RH$$

During the reaction of the water and aluminum alkyl, gases are formed in the mixing chamber 16 and these may be vented therefrom by means of the line 28.

The remaining gases along with the olefin and aqueous phases are discharged from the mixing chamber 16 by means of the line 30 and are introduced into the top of column 32. Column 32 is provided with a downcomer 34 having a cylindrical or funnel-like surface, which defines an upper zone 36 within which gas separation of the light olefin from the liquid phases takes place. The gases are discharged from the zone 36 by means of the line 38 and are combined with the light gases from the line 28 in the line 40. These olefinic gases may be recycled to the polymerization process (by a means not shown) or employed in any suitable manner.

The gases withdrawn by means of the line 38 comprise: unreacted ethylene; some ethane that was in the charge to the alpha olefin process; some butenes produced in the alpha olefin process; and ethanes and butanes produced upon hydrolysis of the catalytic trialkyl aluminum.

The olefinic and aqueous liquid phases descend the downcomer 34 at a rate of about 3 feet per minute and vapors pass therefrom during the descent. The liquid alpha olefin product and the aqueous aluminum hydroxide-containing phases descend through the downcomer 34 into an intermediate zone 42 which is an alpha olefin settling zone. The downcomer 34 is filled with foam and this foam may extend upwardly to a point slightly above the top of the downcomer. The olefinic stream passes up through the annular section of zone 42 at a rate of about 0.8 foot per minute.

It is vital to the success of the present process that the vapors be permitted to separate from the olefinic and aqueous aluminum hydroxide liquid phases prior to the introduction of the feed stream into the intermediate liquid olefinic settling zone 42. The vapor bubbles formed in the process have a tendency to cling to the resulting solid aluminum hydroxide flocs. This reduces the density of the floc to a sufficient degree that the floc would be ordinarily carried up through the intermediate olefinic layer and would thereby contaminate the olefinic product. Additionally, the formation of vapor bubbles and their passage upwardly through the olefin layer would cause agitation of the phases and thereby impede efficient separation of the aqueous aluminum hydroxide phase from the olefinic phase. Accordingly, it is critical that the olefinic vapors be flashed off or otherwise separated from the liquid hydrocarbon and aqueous phases prior to the introduction of the liquid phases into the olefinic settling zone 42.

Furthermore, it is essential that the temperature in the intermediate olefinic separation zone be maintained sufficiently elevated to permit the aluminum hydroxide floc to be more readily wetted by the water in the system than by the olefinic hydrocarbon. Thus, elevated temperatures of, for example, between about 85° and about 130° C. permit the desired preferential water wetting of the aluminum hydroxide floc. This permits the recovery of a high purity olefinic hydrocarbon product relatively free of aluminum hydroxide floc impurities.

As previously mentioned, the liquid phases pass downwardly through the downcomer 34 and into the intermediate olefin settling zone 42. The downcomer 34 extends into the intermediate olefin settling zone 42. The aqueous aluminum hydroxide-containing phase continues to descend through the liquid alpha olefin settling zone at the superficial rate of about 0.25 foot per minute to a lower aqueous aluminum hydroxide settling zone 44. The water emerging from the bottom of the downcomer 34 and passing through the zone 42 carries the bulk of the aluminum hydroxide downward to the interface 46 between the olefinic settling zone and the aqueous aluminum hydroxide settling zone. A certain amount of olefin, water and aluminum hydroxide accumulates at the interface 46 in the form of a scum, but the aqueous aluminum hydroxide-containing phase penetrates this interface and passes into the aqueous phase provided in the zone 44.

The aluminum hydroxide settles as a slurry in aqueous phase in the zone 44. Thus, a cloudy suspension of aluminum hydroxide in water is formed and this suspension is discharged from the bottom of the column 32 by means of the line 48.

The settling rate for the particles contained in the zones 42 and 44 depends upon the size and the density of the settling particles. In most instances, the water will coalesce to form fairly large droplets having a diameter of between about one-fourth and one-half inch. Such droplets settle rapidly through the intermediate olefin zone 42 and pass into the zone 44. The solid aluminum hydroxide has a tendency to accumulate at the interface 46 with only a very minor aluminum hydroxide existing as flocs in the olefin intermediate zone 42. Some of the flocs have sufficient density to settle in the interface 46, but others are carried upwardly and remain suspended in the olefin zone 42. The flocs in the intermediate zone 42, if any, will have a tendency to adhere to the walls of the tower 32. However, any build-up of this nature may be easily removed by flowing water along the walls of the tower by a means not shown. This water stream will carry any hydroxide build-up to the interface 46. The level of the hydrocarbon-water interface 46 in the tower 32 can be adjusted by varying the discharge rates of the materials withdrawn from tower 32.

The olefinic phase is withdrawn from the intermediate zone 42 by means of the line 50. Although the olefinic hydrocarbon stream at this point is substantially free of aluminum hydroxide, a small amount of aluminum hydroxide flocs may become suspended in the olefin and these can be removed by passing the olefinic stream through a filter 52 provided with a suitable filter medium such as glass wool. Additionally, any small amounts of water that may be dissolved in the hot olefin will separate therefrom as the olefinic product is cooled. The employment of a filtering medium, such as glass wool, will aid in coalescing the tiny water droplets so that they may be easily removed. The highly purified olefinic product stream is then removed from the filter 52 by means of the line 54. The filtered olefinic hydrocarbon product is discharged by means of line 54 and has an aluminum content of about 1.7 parts per million.

Meanwhile, the aluminum hydroxide slurry discharged by means of the line 48 from the tower 32 is passed to an aluminum hydroxide settling tank 56. The superficial velocity in the upper part of the settling tank 56 may be, for example, about 2 feet per hour while employing a water residence time of 0.5 hour. The bulk of the aluminum hydroxide settles out as a loose precipitate and is removed by suitable means (not shown). However, some aluminum hydroxide remains suspended in the water as evidenced by a cloudy appearance of the water. This dilute cloudy aqueous suspension is withdrawn from the settling tank 56 by means of the line 58 and is passed by means of the line 59 to a water hold tank 60. Waste water may be withdrawn from the water hold tank by means of the line 64 for disposal.

Water containing some suspended aluminum hydroxide is withdrawn from the tank 60 by means of the line 66 and is recycled for admixture with the olefinic hydrocarbon and reaction with the trialkyl aluminum catalyst in the mixing vessel 16 as previously described. Fresh water can be introduced by means of the line 62 for admixture with the aqueous suspension if desired.

The aluminum hydroxide slurry is easily pumped from the bottom of the tower by means of the line 48 and there is no tendency of the aluminum hydroxide to plug transfer line 48, 58, etc. While the drawing indicates the introduction of fresh water by means of the conduit 62, it is possible to recycle the suspension withdrawn from the settling vessel 56 by means of the line 58 directly to the heat exchanger 22 for admixture in the mixing vessel 16 with removal of the small amount of aluminum hydroxide suspended in this stream. This aqueous phase is suitable for direct employment in the hydrolysis reaction, if desired.

In the event that it is desired to remove aluminum hydroxide from the aqueous phase recovered by means of the line 58, a coagulating agent may be employed in the amount between about 20 and 60 parts per million. A suitable coagulant is a bentonite clay (such as that commercially available as Calgon Coagulant Aid 25). However, coagulating agents should not be added to the water which is to be employed in hydrolysis process of the present invention, since such aids tend to stabilize oil-in-water emulsions and thereby impede the desired separation of the aluminum hydroxide from the olefinic hydrocarbon product.

In lieu of the settling tank 56, the aluminum hydroxide may be removed from the water by any suitable means including centrifuging, filtering and the like. Thus, a rotary filter may be suitably employed in lieu of the settling tank 56, if desired.

As previously mentioned, the process of the present invention should be maintained at at an elevated temperature and while the temperatures of about 100° C. and below have been described, higher temperatures may be employed if super-atmospheric pressures are desired to be utilized.

While the foregoing description has been limited to the treatment of a specific alpha olefin feedstock contaminated with a specific organo-aluminum compound, the present invention is not limited to same and may be employed for the hydrolysis of any organo-aluminum compound and separation of aluminum from a hydrocarbon material.

The following examples further illustrate various aspects in the practice of the present invention. The are presented for illustrative purposes only, and should not be construed as limiting the invention in any way. In the examples, all parts and percentages are by weight, unless otherwise stated.

EXAMPLE 1

This example illustrates the effect of temperature on the hydrolysis process.

A mixture of dodecene, tetradecene and hexadecene containing 0.47 percent triethyl aluminum is heated to a temperature of about 75° C. About 150 cubic centimeters of the contaminated olefinic mixture are placed in a container and about 100 cubic centimeters of water that had been preheated to about 80° C. are added dropwise to the olefinic mixture. The water droplets descend through the olefin layer and a flocculant precipitate forms. The precipitate forms mainly at the olefin-water interface although a significant number of aluminum hydroxide flocs are in the olefin layer.

These flocs do not settle well from the olefin layer and even after the mixture is vigorously agitated the olefin layer remains highly contaminated with a significant amount of the flocculant precipitate.

EXAMPLE 2

The procedure of Example 1 is duplicated with the exception that the olefinic mixture is preheated to 72° C. and the water is preheated to 95° C. The resulting precipitate is noticeably less flocculant than in Example 1. After vigorous agitation which results in the formation of an intimate admixture of the water and the olefin, the resulting olefinic layer is clear and free of floc. About half of the aluminum hydroxide precipitates settles rapidly from the aqueous phase while the other half is flocculant and appears to be in a state of hindered settling. However, there is no appreciable accumulation of precipitate at the water-olefin interface.

EXAMPLE 3

An agitated vessel is purged with nitrogen and 1.5 liters of 0.47 percent triethyl aluminum in olefinic hydrocarbon blend is added. The olefin is heated to 90° C. and 430 cubic centimeters of distilled water, which had been heated to its boiling point, is added rapidly to the olefinic blend. The mixture is vigorously agitated while the water is being added and then permitted to settle.

The emulsion which forms during the agitation breaks rapidly and the resulting olefin phase is clear. The aqueous phase is milky, however, there is very little scum at the interface. A portion of the milky aqueous phase is filtered and reveals a white precipitate. The filtrate is slightly hazy indicating that most of the solids had been removed by the simple filtration.

The following examples illustrate the criticality of removing resulting gases from the hydrolysis action prior to separating the liquid phases.

EXAMPLES 4-6

An olefin feed blend containing 3.2 percent by weight mixed aluminum alkyl in tetradecene is prepared. This blend contains about 0.11 percent by weight aluminum.

The olefinic feed is preheated to a temperature of between about 75° and about 80° C. in a heat exchanger and is pumped to a small mixing T. Meanwhile, hot water is pumped through a heat exchanger to the mixing T where it contacts the olefinic stream. From the mixing T, the olefinic-water admixture is introduced to a column at the rates and conditions indicated in Table 2, below:

TABLE 2

| Example Number: | Mixing temp. at inlet (° C.) | Water rate (cc./hr.) | Olefin rate (cc./hr.) |
|---|---|---|---|
| 4 | 92-97 | 615 | 810 |
| 5 | 92-97 | 645 | 1,020 |
| 6 | 85 | 660 | 1,680 |

The olefin-water interface in Example 4 is held above the inlet from the mixing T. The aluminum hydroxide precipitate is carried upwards by the vapor bubbles formed toward the interface by the olefin droplets rising through the aqueous phase. Much of the precipitate penetrates the interface and remains suspended in the olefin phase. The agitation caused by the gas bubbling through the olefin results in stabilization of the olefin-water emulsion preventing recovery of a high quality product. Also, the aluminum hydroxide becomes wet by the olefin which thereby causes it to remain within the olefin phase.

For comparative purposes, the olefin-water interface in Example 5 is held about 6 inches below the inlet line from the mixing T. In this case, most of the aluminum hydroxide precipitate goes down toward the interface with the water. A small amount of precipitate accumulates as a scum at the interface. However, most of the aluminum hydroxide penetrates the surface and settles at the bottom of the column where it is continuously withdrawn as an aqueous slurry. It appears that as new precipitate enters the interface scum, part of the old scum breaks away and settles through the aqueous phase.

The olefin layer in this example is clear and contains very few aluminum hydroxide flocs.

In Example 6, the interface is held below the inlet mixing T. Again, there are very few aluminum hydroxide flocs suspended in the clear olefin phase. More of the precipitate settles through the aqueous layer.

The process of the present invention as described and exemplified above, permits the hydrolysis of organo-aluminum compounds which are dissolved in hydrocarbon streams with water and eliminates the need for caustic soda or salt. By operating in the manner hereinabove described, a high purity hydrocarbon stream may be recovered which is substantially free of aluminum hydroxide. The aluminum hydroxide precipitate that is produced in the present process is very fine and is recovered in a form that will not result in the plugging of process equipment lines.

Referring again to the drawing, it will be noted that zones 36, 42 and 44 are provided in a single tower 32. However, these zones may be provided in separate vessels, for example, with connecting process lines, so long as the gas separation zone is provided as the upper zone, etc.

The term "boiling point of water" as employed herein includes the normal boiling point of water, viz, 100° C., under one atmosphere pressure, as well as higher temperatures corresponding to the boiling point of water at the respective pressures above one atmosphere.

The invention has been described in detail with particular reference to preferred embodiments thereof, but it will be understood that variations and modifications can be effected within the spirit and scope of the invention as described herein and as defined in the appended claims.

I claim:

1. A process for the removal of aluminum from an olefinic hydrocarbon stream containing an organo-aluminum compound, which comprises forming an admixture of said hydrocarbon stream and water, introducing said hydrocarbon-water admixture into an upper zone, separating a gaseous fraction from said admixture in said upper zone, passing a liquid fraction of said admixture to an intermediate zone after having separated said gaseous fraction therefrom, passing an aluminum-rich aqueous portion of said admixture to a lower zone, withdrawing a substantially aluminum-free olefin stream from said intermediate zone, said process being conducted at an elevated temperature below about the boiling point of water.

2. The process of claim 1 wherein said admixture of the hydrocarbon stream and water is conducted in a mixing zone and a gaseous fraction is separated from said hydrocarbon-water admixture in said mixing zone.

3. The process of claim 1 wherein said process is conducted at a temperature in the range of between about 85° and 130° C.

4. The process of claim 1 wherein the olefinic hydrocarbon stream is the product stream of an alpha olefin process wherein ethylene is polymerized to alpha olefins in the presence of an organo-aluminum catalyst.

5. The process of claim 1 wherein said aluminum-rich aqueous portion of said admixture is discharged from said lower zone into an aluminum hydroxide separation zone.

6. The process of claim 5 wherein water is withdrawn from said aluminum hydroxide separation zone and is recycled for admixture with said olefinic hydrocarbon stream.

7. The process of claim 1 wherein said substantially aluminum-free olefin stream is subjected to a filtering operation to remove any flocs of aluminum hydroxide present therein.

8. The process of claim 1 wherein said admixture of the hydrocarbon stream and water is conducted in a mixing zone and a first gaseous fraction is separated from said hydrocarbon-water mixture in said mixing zone, wherein said process is conducted at a temperature in the range of between about 85° and 130° C., wherein said olefinic hydrocarbon stream is the product stream of an alpha olefin process wherein ethylene is polymerized to alpha olefins in the presence of an organo-aluminum catalyst, and wherein said aluminum-rich aqueous portion of said mixture is discharged from said lower zone into an aluminum hydroxide separation zone.

References Cited

UNITED STATES PATENTS

| | | | |
|---|---|---|---|
| 3,367,989 | 2/1968 | Scoggins et al. | 260—683.15 |
| 3,249,648 | 5/1966 | Carter et al. | 260—683.15 |
| 3,160,672 | 12/1964 | Pearson et al. | 260—683.15 |
| 3,458,594 | 7/1969 | Boyer | 260—683.15 |
| 3,352,940 | 11/1967 | Linden et al. | 260—683.15 |
| 3,482,000 | 12/1969 | Fernald et al. | 260—683.15 |

DELBERT E. GANTZ, Primary Examiner

J. M. NELSON, Assistant Examiner

U.S. Cl. X.R.

260—683.15

PO-1050
(5/69)

UNITED STATES PATENT OFFICE
CERTIFICATE OF CORRECTION

Patent No. 3,562,348        Dated February 9, 1971

Inventor(s) David M. Jenkins

It is certified that error appears in the above-identified patent and that said Letters Patent are hereby corrected as shown below:

Column 5, line 71, "with" should read --without--.

Signed and sealed this 18th day of May 1971.

(SEAL)
Attest:

EDWARD M. FLETCHER, JR.　　　　　　　　WILLIAM E. SCHUYLER, JR.
Attesting Officer　　　　　　　　　　　　Commissioner of Patents